(No Model.)

C. M. HAGER.
EGG BREAKING AND MEASURING UTENSIL.

No. 603,635. Patented May 10, 1898.

Witnesses.
W. J. Baldwin
E. M. Healy

Inventor.
C. M. Hager.
By
Southgate & Southgate
Attorneys.

UNITED STATES PATENT OFFICE.

CARL M. HAGER, OF WORCESTER, MASSACHUSETTS.

EGG-BREAKING AND MEASURING UTENSIL.

SPECIFICATION forming part of Letters Patent No. 603,635, dated May 10, 1898.

Application filed August 14, 1897. Serial No. 648,232. (No model.)

*To all whom it may concern:*

Be it known that I, CARL M. HAGER, a citizen of the United States, residing at Worcester, in the county of Worcester and State of Massachusetts, have invented a new and useful Improvement in Egg-Breaking and Measuring Utensils, of which the following is a specification.

My invention relates to a kitchen utensil which has been especially designed for use in bakeries or hotel kitchens using eggs in large numbers; and the object of my invention is to combine a breaking-collar with a drip-flange to prevent the eggs from running down on the outside of the utensil, the breaking-collar preferably being perforated around a portion only of its periphery, as hereinafter described.

Figure 1:
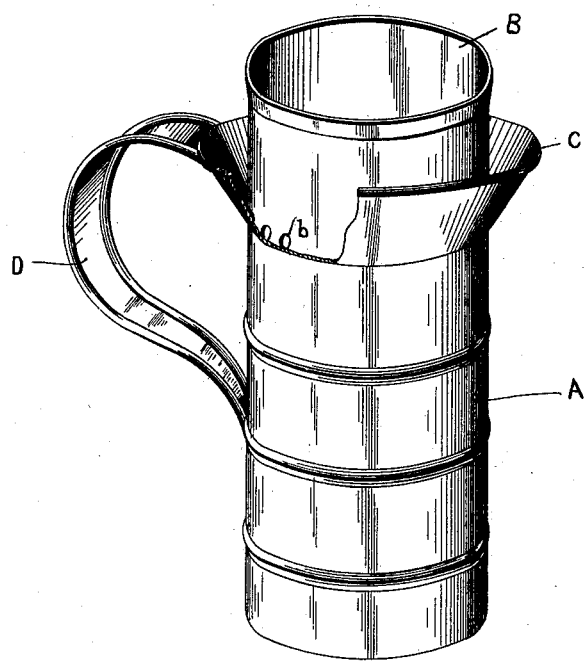
Figure 2:
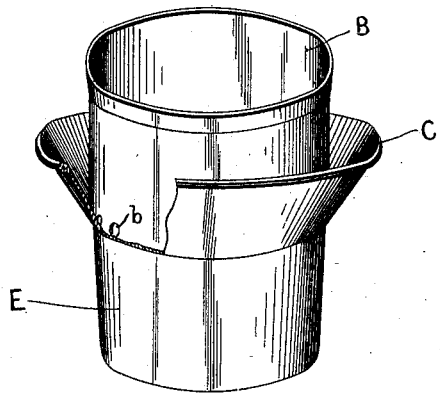

In the accompanying drawings, Figure 1 is a perspective view, partially broken away, of an egg-breaking and measuring utensil constructed according to my invention; and Fig. 2 is a perspective view illustrating a slightly-modified form of construction.

Where cake is cooked in large quantities, the eggs therefor are now ordinarily broken into an ordinary tin measure, and unless care is exercised it frequently happens that the eggs are wasted by running down on the outside of the receptacle employed, and in practice I have found that the ordinary pastry boards and tables of a bakery are often stained and soiled from this cause.

The especial object of my present invention is therefore to provide a measuring utensil with an upwardly-extending egg-breaking collar, combined with which is an upwardly-flaring drip-flange.

Referring to the drawings and in detail, A designates the body portion of a measure, which may be graduated in the ordinary manner. Extending up from the body portion A and preferably formed integrally therewith is an egg-breaking collar B.

Instead of spinning or turning the upper edge of the metal forming the breaking-collar B around a wire in the ordinary manner I preferably bend the metal back on itself, so as to leave a comparatively sharp breaking edge on the upper end thereof, and in practice I have found that this is a desirable construction, as the eggs can be cracked more cleanly upon a comparatively sharp edge than on a rounding edge, which is apt to splinter the egg-shells.

Secured to and extending from the breaking-collar B is a flaring drip-flange C.

The breaking-collar B is perforated around a portion of its periphery, as at *b*, to permit the eggs running down the outside of the breaking-collar B to run back to the inside of the receptacle A.

I preferably perforate the breaking-collar B around a portion only of its periphery, so that the perforations will not interfere with pouring the eggs out over the front or sides of the breaking-collar.

A handle D is secured to the flange B and body portion A, as in the ordinary tin measures.

In some cases instead of forming the breaking-collar B integrally with the body portion of the receptacle I contemplate employing a separate breaking-collar, which can be used as an attachment in connection with the ordinary tin measure.

As illustrated in Fig. 2, the breaking-collar B, which is provided with a flaring drip-flange C and is perforated at *b*, substantially as hereinbefore described, is provided with a downwardly-extending slightly-tapering portion E, which is adapted to fit into the top of an ordinary tin measure.

Having thus fully described my invention, what I claim as new, and desire to secure by Letters Patent of the United States, is—

1. As an article of manufacture, an egg-breaking utensil comprising a breaking-collar and an upwardly-flaring drip-flange, said breaking-collar being perforated, substantially as described.

2. As an article of manufacture, an egg-breaking utensil, comprising a breaking-collar, an upwardly-flaring drip-flange of less height than said breaking-collar, said breaking-collar being perforated around a portion only of its periphery, substantially as and for the purpose set forth.

3. As an article of manufacture, an egg-breaking utensil comprising a graduated body portion A, an upwardly-extending breaking-collar B formed integrally therewith, and a flaring drip-flange C of less height than said breaking-collar, said breaking-collar having perforations located at its rear side, substantially as and for the purpose set forth.

In testimony whereof I have hereunto set my hand in the presence of two subscribing witnesses.

CARL M. HAGER.

Witnesses:
PHILIP W. SOUTHGATE,
HENRY EVELETH HILL.